United States Patent [19]

Hutchins

[11] Patent Number: 5,291,416
[45] Date of Patent: Mar. 1, 1994

[54] EVENT FEEDBACK FOR NUMERICALLY CONTROLLED MACHINE TOOL AND NETWORK IMPLEMENTATION THEREOF

[75] Inventor: Charles S. Hutchins, North Palm Beach, Fla.

[73] Assignee: Software Algoritms Incorporated, North Palm Beach, Fla.

[21] Appl. No.: 666,810

[22] Filed: Mar. 8, 1991

[51] Int. Cl.⁵ .......................................... G05B 19/417
[52] U.S. Cl. ........................... 364/474.16; 364/474.11; 364/474.22
[58] Field of Search .................. 364/138, 139, 474.11, 364/474.16, 474.17, 474.19, 569, 474.22, 131–136, DIG. 1, DIG. 2; 318/563–565; 377/2, 15, 16

[56] References Cited

U.S. PATENT DOCUMENTS

4,472,783  9/1984  Johnston et al. ........... 364/474.11 X
4,887,220  12/1989  Kiva et al. .................. 364/474.11
5,088,045  2/1992  Shiminaka et al. ............. 364/138 X

FOREIGN PATENT DOCUMENTS

0389990  10/1990  European Pat. Off.

OTHER PUBLICATIONS

"Next Generation Workstation/Machine Controller: Requirements Definition Document", *National Center for Manufacturing Sciences*, Jun. 1990, pp. 3-83-3-93.

*Primary Examiner*—Joseph Ruggiero
*Attorney, Agent, or Firm*—Krass & Young

[57] ABSTRACT

The normal course of operating a numerically controlled machine tool includes the automatic collection of significant event data without any special interaction by the machine tool operator. These events are of two types: those embedded in the machine tool part program, which may be ordinary program steps or special event markers; and those which represent operator intervention of the programmed process operating on the machine tool. The theoretical time for the occurrence of the programmed events is embedded in the machine tool part program. The identity, date and time of the actual occurrence of an event is stored in nonvolatile memory. This technique may be used in a single computer controlling one or more machine tools or in a network with a host computer serving as the event depository and as the source of machine tool part programs. The event records are available for analysis to improve the productivity of the operation.

12 Claims, 5 Drawing Sheets

EVENT FEEDBACK FOR NUMERICALLY CONTROLLED MACHINE TOOL AND NETWORK IMPLEMENTATION THEREOF

TECHNICAL FIELD OF THE INVENTION

The technical field of the present invention involves the operation of numerically controlled machine tools, optionally connected to computer networks.

BACKGROUND OF THE INVENTION

It has heretofore been proposed to integrate the operation of numerically controlled machine tools into a computer network. The typical reason for construction of such machine tool computer networks is the simplified access to and maintenance of the machine tool part programs for the numerically controlled machine tools. At one time it was standard to provide the machine tool part programs for numerically controlled machine tools via a punched paper tape. This punched paper tape was loaded into a reader at the particular machine tool and read one program step at a time during the operation of the machine tool. Such a paper tape system was cumbersome for several reasons. First, such a system required physical relocation of the paper tape within the reader in order to rerun the program for an additional part, or to rerun one block (step) of the program such as, for example, to repeat a particular single operation of the machine tool. These punched paper tapes generally are too easily damaged to have a reasonable lifetime on the shop floor. Lastly, it is difficult to insure that each machine tool is using the latest and best version of the machine tool part program for a particular operation when numerous differing paper tape programs are available on the shop floor. Thus it is difficult to control the machine tool operation using paper tapes.

A computer network for providing machine tool part programs for numerically controlled machine tools solves many of these problems. In such a computer network, the machine tool operator would obtain the machine tool part program for the machine tool from the computer network. This machine tool part program would be stored in a permanent magnetic disk medium at a central location. This ensures availability of the machine tool part program. In addition, each machine tool doing the same operation would be supplied with the same machine tool part program. This means it is very easy to distribute to all the machine tools the latest and best version of a particular machine tool part program for a particular part.

U.S. Pat. No. 3,668,653 issued to Fair et al on Jun. 6, 1972 entitled "Control System" discloses an example of such a computer network for numerically controlled machine tools. The control system of the Fair et al patent includes an additional feature. The program recalled from the computer network can be operated in a RUN mode or in a CONVERSATION mode. In the RUN mode the individual machine tool operator has only limited capability of modifying the machine operation. This limited capability involves such things as withdrawal of the tool to correct tool breaks and the skipping or repeating of individual blocks of the machine tool part program such as employed when reworking a previously worked part. The CONVERSATION mode permits more extensive modification and editing of the machine tool part program specifically in "source language". This CONVERSATION mode permits a master machine tool operator or programming engineer to create, modify or debug a machine tool part program for a particular part. After modification this machine tool part program can be used by this or other machine tools in the RUN mode to produce parts.

A further example of a computer network employed with machine tools is U.S. Pat. No. 4,251,848 issued Feb. 17, 1981 to Cambigue et al entitled "Paging, Status Monitoring and Report Compiling System for Support, Maintenance and Management of Operator-Supervised Automatic Industrial Machines." The Cambigue patent teaches a distributed microcomputer network for communication of machine tool operator Initiated CALL and encoded STATUS signals. Each machine tool includes an operator console that is connected to the distributed microcomputer network. This system permits the machine tool operator to initiate a CALL that is automatically transmitted to maintenance personnel via either a terminal or a printer connected to the microcomputer network, and is Indicated on a visual display board. Thus the machine tool operator need not leave his work station to report problems to the proper support personnel. This system includes a set of thumb wheel switches for the machine tool operator to enter the proper CALL and STATUS signals. In addition, the system automatically detects the ON and OFF status of the machine tool and the ON and OFF status of the operator feed rate override. The network logs and reports any change in the ON and OFF status of the machine tool or of the operator feed rate override. The Cambigue patent teaches that the use of a distributed network of microcomputers for the communication system is advantageous because the communication system is not dependent on the availability of any particular computer.

The Applicant believes that the prior art does not provide the tools necessary to manage the operation of a plurality of numerically controlled machine tools to the best advantage. Greater feedback of events occurring at the numerically controlled machine tools, beyond that used in the closed loop servo system and beyond knowing that the machine tool is running or not, is needed. It is axiomatic that it is impossible to determine how to do something better if you don't know how you are doing it now. Greater feedback provides additional information to industrial/manufacturing engineers permitting them to make substantiated decisions for improving the processes occurring at the machine tools. As a result, the industrial/manufacturing engineers can further optimize the utilization of the numerically controlled machine tools.

SUMMARY OF THE INVENTION

The present invention involves the automatic generation and collection of significant event data in real time during the normal course of operating any numerically controlled machine tool equipped with this invention. This data generation and collection happens without any special interaction by the machine tool operator and does not in any way interfere with the normal operation of the machine tool. It takes advantage of the fact that certain significant events are already programmed into the sequence of instructions which represent the machine tool part program for manufacturing the part and that the theoretical time for the execution of each block in the program is also known. While the machine tool servo system closes the loop on the servo controlled axes of the machine tool, the present invention closes an outer loop, that Is the overall process to manufacture a part or portion thereof, and permits the user to analyze the total production process. Because each local computer knows the date and time of day, a complete significant event record consisting of the event, date, and time will be generated for each event.

These events are of two types. Each machine tool part program employed by one of the machine tools includes embedded therein markers identifying particular events. These event markers include points such as, but not limited to, where: a tool needs to be changed; the program must stop for a manual operation; the program may be optionally stopped; and the program ends. In addition, the machine tool part program may also include other special event markers. The other type of events reported include operator initiated events at the machine tool. These machine tool operator initiated events include, but are not limited to: down-loading a machine tool part program to the machine tool; setting the batch size; beginning or ending the operation cycle of the machine tool part program; skipping or deleting operations such as may occur when reworking a work piece; editing the machine tool part program data using the local editing capabilities of the controller; and setting the feed rate override (FRO), spindle speed override (SSO), or the traverse rate override (TRO).

This technique may be used with current computer numerically controlled machines by revising their control software-firmware to generate the event records and by transmitting same via the serial port to a host computer programmed to accept and store the records.

This technique may be used with a single computer controlling one or more machine tools. In the single computer/machine tool(s) environment, these event records are stored in a local nonvolatile memory, such as a hard or floppy disk or other appropriate recording media.

This technique may also be used in a network environment as described In detail in this document. When implemented in a network, each machine tool becomes a true peripheral device attached to a node of the network. Thus each machine tool is integrated into the network and able to communicate in a peer-to-peer manner with a host computer. In this embodiment, the event records are transmitted over the network and stored in a nonvolatile memory in a host computer within the network.

In each of these cases, the machine tool event records are available for analysis by persons interested in improving the productivity of the operation. Thus it is possible for an engineer to later review the significant events occurring during the operation of one or more machine tools during manufacture of several parts according to the same machine tool part program and to identify places where the machine tool part program execution has deviated from the planned process. This review may include comparison of the last operation with statistics formed from event data for previous operations of the same type machine tool for manufacture of the same part using the same machine tool part program or an earlier version of that machine tool part program. This reporting of events occurring during the manufacture of each part provides the engineer with information to support decisions leading to changes in the machine tool part program resulting in improved quality, reduced cycle time, decreased tool breakage, increased tool life, or the like. In the current art, the performance data necessary to make process design choices in the machine tool part program is not available in a consistent, reliable, and easily obtained manner and is not automatically assembled in a single place or presented to managers in an understandable real time display. Often the engineer must rely upon the memory of one or more machine tool operators to determine the incidence of unusual events that impact manufacturing efficiency. At best, this is a haphazard process. This invention permits a measured determination of the degree of success or failure for a machine tool part program change. During the next execution of the machine tool part program in the manufacturing facility, the event data collected will be available to verify in detail the results of the program change.

In addition, the computer network serves the function of distributing machine tool part programs to the machine tools and of recording changes made to the machine tool part programs by operators at the machine tools using local editing capabilities. The provision of a single source for the programs for each machine tool ensures that each machine tool is operating using the current version of any particular program. The capture and analysis of the local edit changes is significant because this may provide further feedback information to enhance the manufacturing process or identify problems.

BRIEF DESCRIPTION OF THE DRAWINGS

These and other aspects of the present invention will become clear from the following description of the invention taken together with the figures In which.

DETAILED DESCRIPTION OF THE PREFERRED EMBODIMENTS

I. The Computer Network

Figure 1:
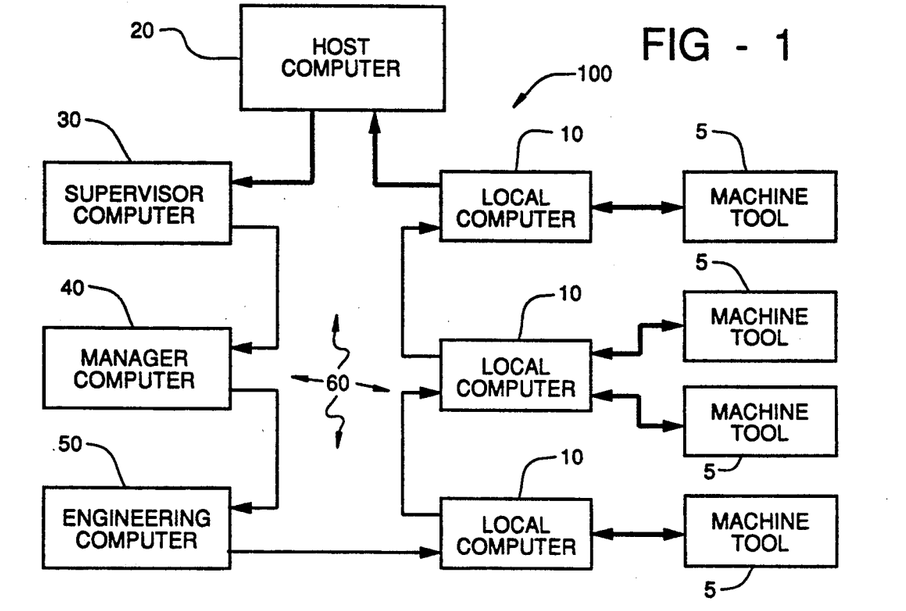
FIG. 1 illustrates in block diagram form the general construction of the computer network for control of numerically controlled machine tools of the present invention.

FIG. 1 illustrates the computer network for control of numerically controlled machine tools of the present invention. FIG. 1 shows computer network system 100 that includes one or more machine tools 5. The machine tools 5 are interfaced to a local computer 10. Note that a single local computer 10 may control plural machine tools 5. Each local computer 10 together with a host computer 20 is coupled in a computer network 60. The network may optionally contain additional host computers and may also contain one or more supervisor computers 30, manager computers 40, engineering computers 50 and other computers as may be appropriate.

FIG. 1 illustrates computer network 60 utilizing ARCNET technology. The topology of this network is logically a ring, but may be star-like in its physical layout. Each computer of computer network 60 sends and receives messages to/from other computers on the network. For this application in a real-time manufacturing environment, it is preferable to have a peer-to-peer, deterministic network, rather than a random one. For maximum flexibility, each computer on the network should be permitted bidirectional communication with all other computers on the network. It should be stressed that while this example uses an ARCNET network, many networking schemes including serial networking via RS232 or RS422 would do the job.

II. The Host Computer

Figure 2:
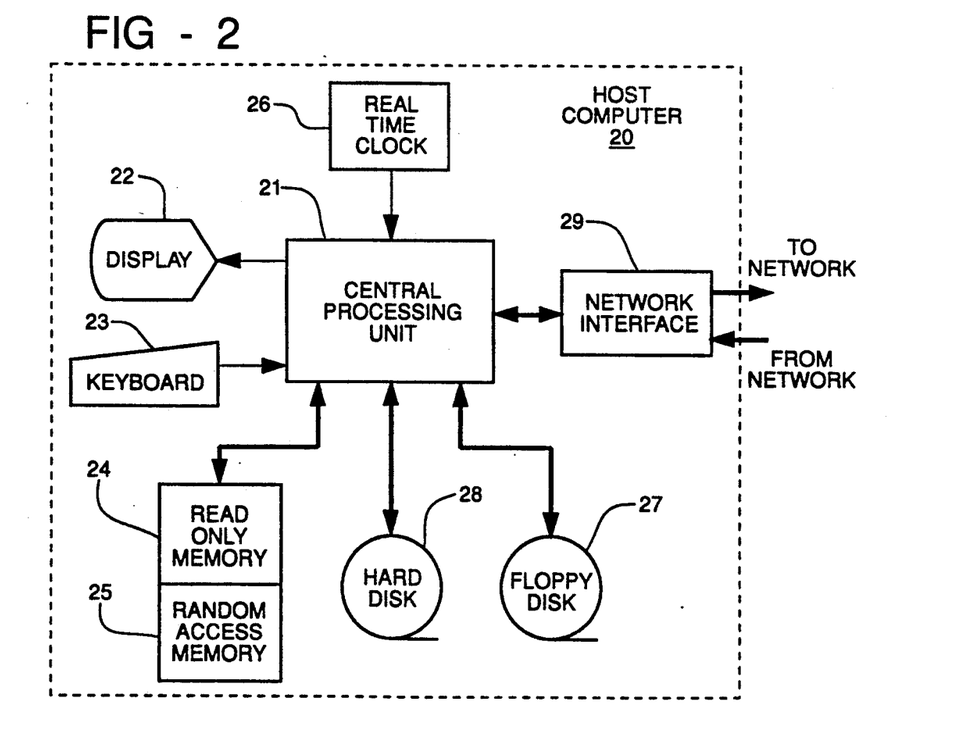
FIG. 2 illustrates in block diagram form the construction of host computer 20 illustrated in FIG. 1.

FIG. 2 illustrates in block diagram form the construction of host computer 20 of the preferred embodiment of the present invention. Host computer 20 includes central processing unit 21. Central processing unit 21 is coupled to display 22 and keyboard 23 for interaction with a computer user. Central processing unit 21 is bidirectionally coupled to a memory unit including read only memory 24 and random access read/write memory 25.

Host computer 20 includes a real time clock 26 that provides the current date and time. Real time clock 26 supplies this indication of the current data and time to central processing unit 21. Real time clock 26 preferably includes a back-up power supply, such as a battery, for powering real time clock 26 when host computer 20 is turned off. This permits real time clock 26 to maintain the current time even when host computer 20 is turned off.

Host computer 20 includes two nonvolatile read/write memory devices. The first of these is floppy disk drive 27. Floppy disk drive 27 is one of the known types of removable magnetic media. These come in a variety of sizes and memory capacities. Floppy disk 27 is employed to introduce new programs and data into host computer 20, and store data from host computer 20, such as required for making backups of hard disk 28. Hard disk 28 is a nonremovable magnetic disk memory of a large capacity. A capacity of at least 40 megabytes is recommended for the operation of the present invention.

Network Interface 29 serves as the connection to computer network 60. Network Interface 29 Is bidirectionally coupled to central processing unit 21 and is further coupled to computer network 60. Network interface 29 sends and receives messages to/from other computers using computer network 60. This process is facilitated by a unique address for each node on the network.

Central processing unit 21 preferably includes a microprocessor of at least the capacity of an Intel 80286 microprocessor running at 8 Mhz. Host computer 20 is preferably of a minimum capacity and power corresponding to an IBM PC/AT desk top personal computer or compatible. Depending upon the number of local computer 10 units supported and the number of optional supervisor computers 30, manager computers 40 and engineering computers 50 supported and the number of different machine tools 5 requiring different types of programs, central processing unit 21 may be of greater capacity such as that of an Intel 80386 or 80486 microprocessor.

III. The Local Computers

Figure 3:
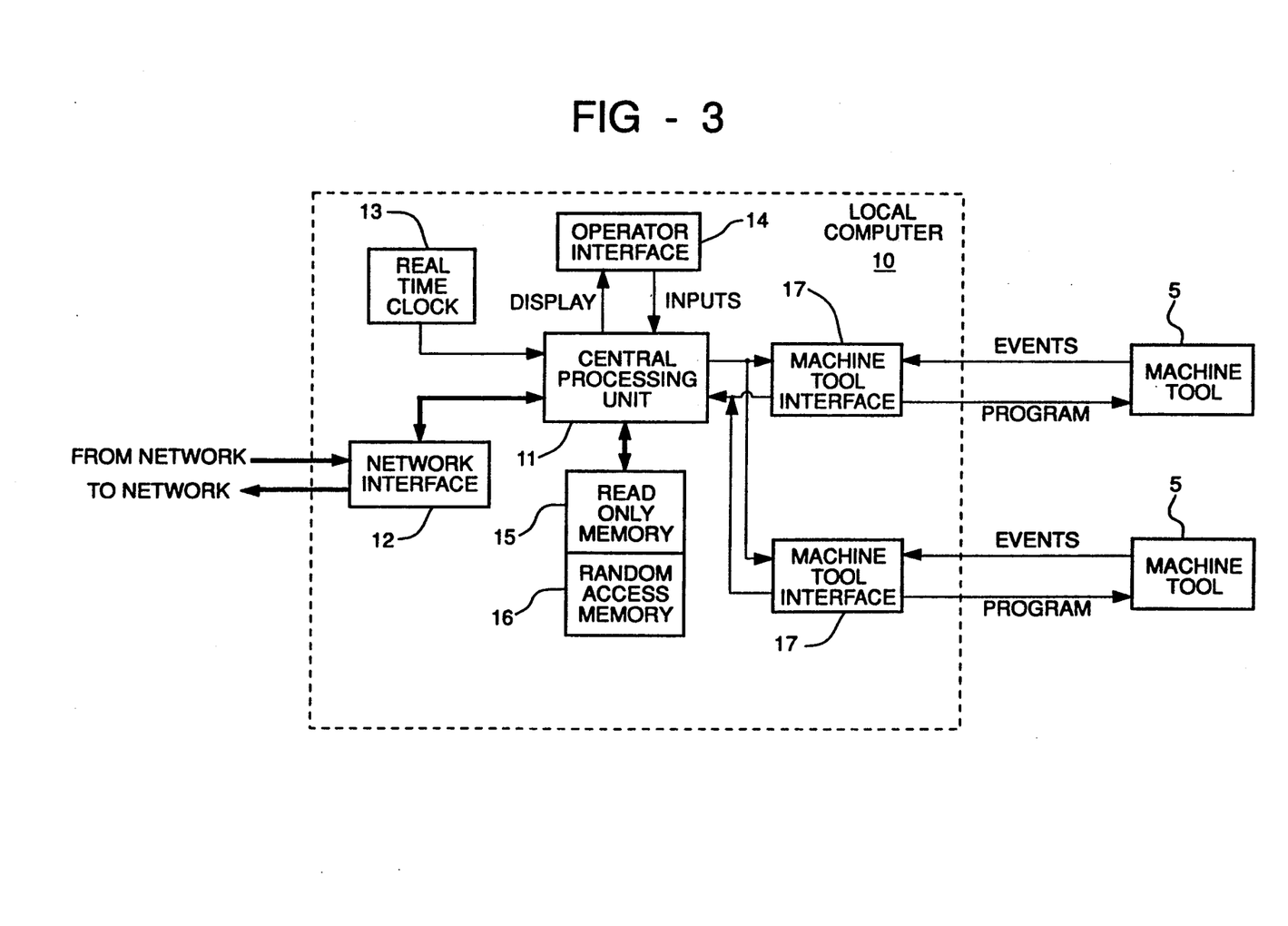
FIG. 3 illustrates in block diagram form the construction of a typical local computer 10 illustrated in FIG. 1.

FIG. 3 illustrates the construction of each local computer 10 in block diagram form. Each local computer 10 is preferably a diskless computer having no nonvolatile read/write memory. Local computer 10 includes central processing unit 11, network interface 12, real time clock 13, computer user Interface 14, memory including read only memory 16 and random access read/write memory 16, and at least one machine tool interface 17.

Network interface 12 forms the connection between local computer 10 and computer network 60. Network interface 12 sends and receiver messages to/from other computers within computer network 60. Network interface 12 operates in the same manner as network interface 29 described in conjunction with host computer 20.

Real time clock 13 generates a digital signal indicative of the current date and time. This date and time signal is supplied to central processing unit 11. Central processing unit 11 employs this date and time signal in the event reporting process in a manner described below. Real time clock 13 permits determination of the time of occurrence of events at machine tool 5. Real time clock 13 operates in a manner Identical to real time clock 26 of host computer 20. Alternately, real time clock 13 may be Set to the current date and time upon each initial application of electric power and the rebooting of the local computer 10 from the host computer 20.

The computer user interface 14 permits two way interaction between the machine tool operator and computer 10. Computer user interface 14 may include a video display, flat panel display, touch screen, keyboard, or buttons as appropriate and serves as the user interface of local computer 10. The computer user interface 14 includes a display that produces a visual image corresponding to display signals from central processing unit 11 for the user Of local computer 10 and the corresponding machine tool(s) 5, and input devices, i.e., touch screen keyboard, buttons that produce input signals as software interrupts that permit the machine tool operator to direct the operation of the system.

While not a requirement for the use of this invention, a touch screen display for the user interface is believed to be advantageous. A touch screen display can replace the keyboard, making a more friendly interface for the skilled machinists who run these machines. In addition, eliminating the keyboard eliminates a component susceptible to dirt in the manufacturing environment where machine tools exist. Touch screen displays are typically used with a Menu program. The computer is programmed to display various labelled regions on the touch screen display. The program performs a corresponding function when the machine tool operator touches one of these regions. This technique permits local computer 10 to change the meaning of various regions on the touch screen display to correspond to the current operating condition of machine tool 5. Thus local computer 10 can generate a display on computer user interface 14 having available options that is changeable to fit the circumstances. All possible available inputs need not be presented to the machine tool operator simultaneously, but only those relevant to the current operating state. Touch screen displays of the type described here are known in the art.

Central processing unit 11 is bidirectionally coupled to a memory unit comprising read only memory 15 and random access read/write memory 16. In the prior art, read only memory 15 has included fundamental portions of the program run by central processing unit 11. In the present invention, these read only memory programs include a self-test program for testing the operation of local computer 10 upon initial application of electric power, and the basic input/output system that permits central processing unit 11 to communicate with the various input and output devices.

Random access memory 16 is a volatile memory. Random access memory 16 stores the operating system, the program or programs being executed by local computer 10, the machine tool part program and any data which local computer 10 computes. In the preferred embodiment of the present invention random access memory 16 comprises a minimum of 512 kilobytes.

The operating system, any application programs run by local computer 10, and the machine tool part program supplied to machine tool 5 are preferably not permanently stored by local computer 10. Host computer 20 supplies these programs via computer network 60 and network interface 12. Local computer 10 preferably has a network interface 12 and machine tool interface 17 embodied in plug-in boards. Network interface 12 includes instructions in read only memory making it appear to be a bootable device. Upon initial application of electric power to local computer 10, after completion of the Pre Operative Self Test (POST), local computer 10 seeks its operating system from network interface 12. Network interface 12 in turn requests the operating system from host computer 20 via computer network 60. Host computer 20 supplies this requested operating system via computer network 60 for storage within random access memory 16.

It should be noted that while in this example local computer 10 includes no nonvolatile read/write memory, there may be situations where this might be desirable and the current implementation does not preclude its use.

Local computer 10 interacts with machine tool 5 via the machine tool interface 17. The machine tool interface 17 also signals other events to computer 10. These event signals will be later disclosed.

As shown in FIGS. 1 and 3, a single local computer 10 may control plural machine tools 5. If this is the case, the local computer 10 must have the capacity to simultaneously service all the corresponding machine tools 5.

IV. Other Computers

Each of the other computers, including supervisor computer(s) 30, manager computer(s) 40 and engineering computer(s) 50, have the same overall organization as host computer 20. These computers are optional, that is not required for the operation of the present invention. These computers will have computing capacity and disk capacity suited to their intended use.

V. The Software

The programs operating on the various computers will now be described. Program elements of the type known in the art will not be described in detail. Instead, these processes will be described in summary form. Program elements unique to this invention will be described in more detail In conjunction with flow charts. These flow charts will not show the exact detailed operations of the present invention. Rather, these programs will show the general outline of the manner in which the processes of the present invention are performed.

The Applicant believes that one skilled in the art of computer programming would be able to provide the programs necessary for performance of the present invention from the totality of the present description. This process would be dependent upon the particular microprocessor employed by the particular computer and the operating systems and computer languages supported by this microprocessor.

i. The Operating System

The operating system employed in the several computers preferably provides a networked, multi-tasking, message passing environment. Each computer preferably employs the QNX operating system. The QNX operating system is a UNIX-like operating system that includes multi-tasking, networking, and intertask messaging. The QNX operating system consists of several independently running tasks, i.e., scheduler, file system, device handler, idle, netboot, an instance of login for each virtual window, and, once logged in, a shell task to handle the installation and execution of other programs within the system. These programs may have parent-child or sibling relationships. The programs operate simultaneously and independently, responding to interrupts and messages and governed by priorities and time slicing of the multi-tasking operating system. Each of these subsidiary programs may block (i.e. be dismissed or inactive) waiting for an interrupt or message, or may terminate when its task Is complete. While other UNIX systems might be used, the QNX operating system is preferred. The QNX operating system currently provides a rich environment for such applications and does so with a real time performance level superior to most others, and has been specifically designed to take advantage of computers using the Intel microprocessor architecture.

ii. Host Computer Software

Figure 4:
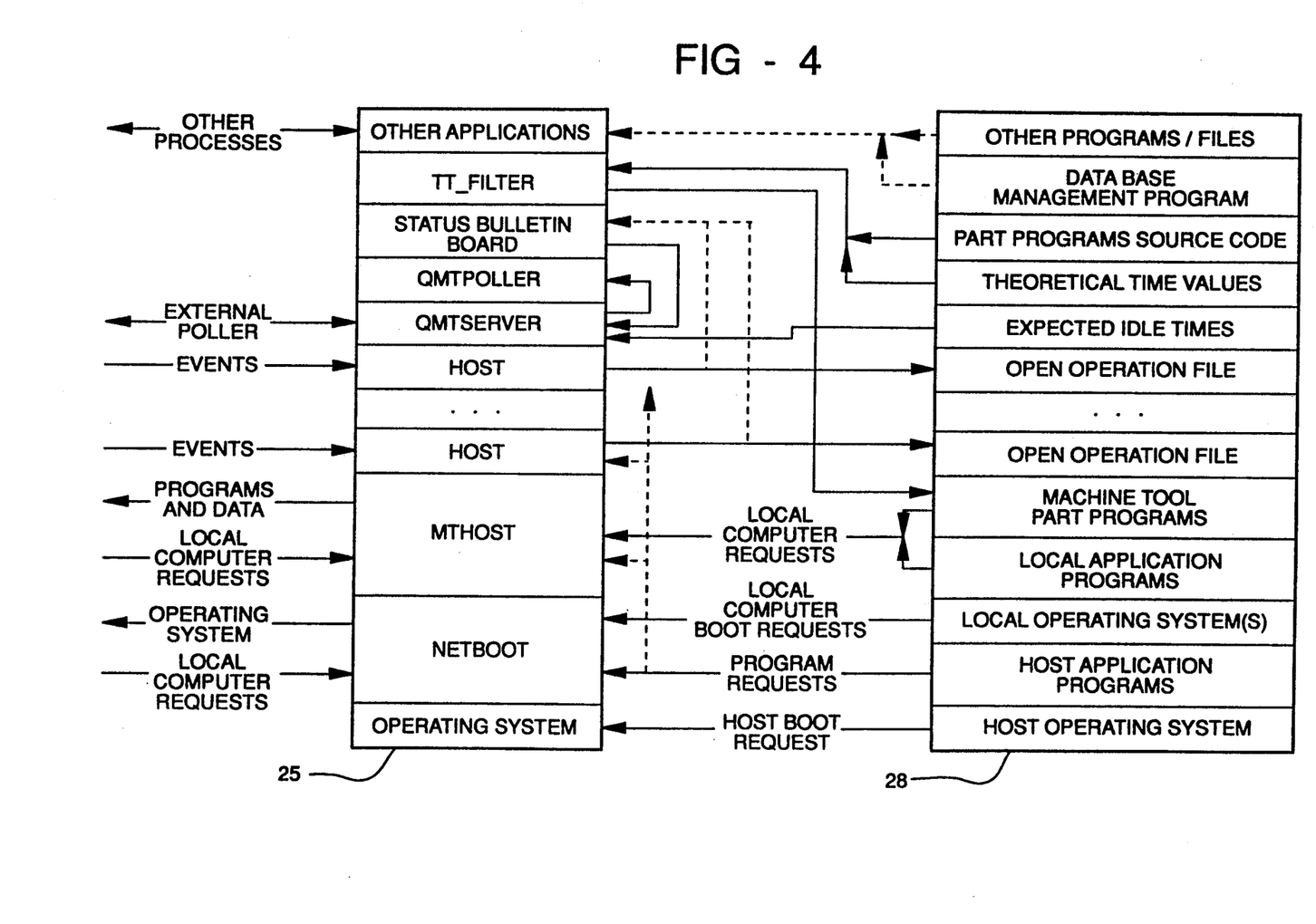
FIG. 4 illustrates in chart form the main programs and subprograms executed on the host computer together with their interaction with nonvolatile memory.

FIG. 4 illustrates schematically the interactions of programs operating on the host computer 20 with computer network 60 and with hard disk 28. Host computer 20 preferably employs the QNX operating system, a multi-tasking, multi-user, networked operating system permitting multiple tasks to be performed simultaneously and asynchronously. This operating system will be operating In protected mode if central processing unit 21 of host computer 20 is an Intel 80286, 80386, or 80486 microprocessor. These plural operating multiple tasks are illustrated as occupying portions of random access memory 25. Their relationship to each other and to other portions of the system of this invention are discussed below.

When power is applied to the system, a reset signal causes execution of a Pre-Operative Self Test (POST) stored in read only memory 24 (not shown in FIG. 4). When the POST is complete, the executing code in read only memory 24 then looks for a bootable device. The partition table of the hard disk 28 directs this process which is well understood by those familiar with the art of microcomputers. In response to this boot request, hard disk 28 supplies the QNX operating system, which is stored in a predetermined location within hard disk 28, to random access memory 25. Program control then shifts to this operating system.

Once the QNX operating system is operational on the host computer 20, it recalls the NETBOOT program from an area of hard disk 28 storing Host Application Programs. This NETBOOT program then starts and immediately goes blocked (i.e. dismissed or inactive) waiting to receive a boot request message from a local computer 10. When such a boot request has been received, the NETBOOT task running on host computer 20 recalls a copy of the operating system appropriate for the requesting local computer from an area of hard disk 28 storing the one or more operating systems and transmits this operating system to the requesting local computer 10 via computer network 60. Note that differing local computers 10 may have differing character and require different operating systems. The NETBOOT program supplies the operating system appropriate to the requesting local computer.

Note that hard disk 28 stores the various programs used by host computer 20 in the area designated Host Application Programs. When needed, these programs are recalled from hard disk 28 and stored in a free space of random access memory 25. This process is illustrated schematically via dashed lines in FIG. 4.

The first task in support of this invention to execute on host computer 20 is called MTHOST. The MTHOST program is recalled from an area of hard disk 28 storing Host Application Programs and stored in random access memory 25. The first function the MTHOST program performs is registering its name with computer network 60 so that the local computers 10 will know which of the computers on the network is the host computer 20. The MTHOST program then blocks waiting for a request to establish a machine tool on the network. Because of this design consideration, any computer on the network with adequate computing power and disk storage could be a host computer.

As previously disclosed, host computer 20 stores programs and data used by local computers 10 on hard disk 28. These include machine tool control programs (sometimes referred to as executive programs in the computer numerical control field) and data relating to the operation of these machine tool control programs. In FIG. 4 these are stored in the area designated Local Application Programs. The host computer 20 also stores the machine tool part programs used for the manufacture of parts on the machine tools attached to the local computers 10 which are nodes of the network 60. These machine tool part programs are stored in the area designated Machine Tool Part Programs. Host computer 20 communicates with all local computers 10 via computer network 60. Host computer 20 can also communicate with any or all supervisor computers 30, manager computers 40, engineering computers 50 and other computers as appropriate via the network 60.

When MTHOST receives a request from a specific local computer 10, it initiates an instance of the program HOST on the host computer 20. This program HOST is blocked (i.e. dismissed or inactive) waiting for an event signal (message) from its local computer 10 running the host communications program. When an event signal is received from its local computer 10, the HOST program writes the event data (kind of event, date, and time) to a corresponding Open Operation File on hard disk 28 corresponding to the particular machine tool 5 and the particular batch of parts which are now being manufactured. Next the HOST program updates the status of the corresponding machine tool 5 according to the received event signal. Thus the HOST program maintains the current status of its machine tool in a Status Bulletin Board located in a reserved portion piece of random access memory 25. This is like a continuously updated chalk board showing the status of all the operating machine tools 5 in the non-computer world. This permits generation of a status summary and individual machine tool detail status. This status data is employed in a manner described next in conjunction with the query machine tool function 200.

The status of a particular machine tool within the Status Bulletin Board is determined by the most recently received significant event. The HOST program keeps this status data based on the time of occurrence of significant events. The HOST program receives such an event signal when a machine tool part program is transmitted to its local computers 10 for execution by a machine tool 5. This operator initiated event occurs when the machine tool operator begins setting up the machine to run this particular machine tool part program. Thus the HOST program knows of the identity of the particular machine tool part program being executed by the machine tool 5. The HOST program also receives an event signal indicating the number of parts in a production batch. In manner that will be more fully detailed below, the HOST program knows the theoretical time, i.e., the time required to execute the machine tool part program without operator intervention, for the manufacture of the part. This theoretical time is employed to compute the earliest completion time for the batch and to compute the percent performance.

iii. Machine Tool Status Queries

Another program operating on the host computer 20 is called QMTSERVER (query machine tool server). It has a client/server relationship with the program QMTPOLLER (query machine tool poller). On request, QMTSERVER provides overview information concerning the current status of all the machine tools connected to and operating on the network. Optionally, it may also provide detailed status information for a specific machine tool. This data is provided after consulting the Status Bulletin Board. Program QMTSERVER waits in a blocked (i.e. dismissed, inactive) state ready to respond to these requests from QMTPOLLER.

As mentioned previously, the HOST program running on host computer 20 continually maintains a Status Bulletin Board indicating the status of each machine tool. The status for each machine tool is based upon the last received event signal for that machine tool. Any computer on the computer network 60 running the QMTPOLLER program can request the current machine tool status information by sending a message to the QMTSERVER program running on host computer 20. The QMTPOLLER program then displays the status of the machine tools in the network. The QMTPOLLER program preferably permits the display of summary information covering all machine tools on one or more screens or, at the users request, a more detailed status regarding a selected machine tool on a single screen. This status display will be further described below in conjunction with FIG. 6. As illustrated schematically in FIG. 4, the QMTPOLLER program may be running on host computer 20 as a separate task, or may be running on any computer on the network 60 as an external poller. The interaction between QMTSERVER and QMTPOLLER is the same in either case.

QMTSERVER preferably computes the theoretical time for each machine tool 5 to complete its scheduled batch. This computation is made from theoretical time data embedded in the machine tool part program. This theoretical time data is produced in a manner that will be discussed below. The computation of the theoretical time to complete the current scheduled batch preferably takes into account scheduled idle times. The scheduled idle times, such as for scheduled breaks, meals, scheduled end of shift clean-up and the like, are stored in the Expected Idle Times portion of hard disk 28. QMTSERVER accesses this data and computes the expected completion time taking into account these scheduled idle times.

iv. Theoretical Time Filter

Prior to cutting the first piece from a particular machine tool part program, the machine tool part program must be passed through the program TT_FILTER (theoretical time filter). This program computes the theoretical time based on machine tool data for axis acceleration, velocity, deceleration, dwell time, tool change time, etc. Data regarding these quantities for each machine tool supported are stored in the area designated Theoretical Time Values. In the preferred embodiment, TT_FILTER alters the machine tool part program to carry theoretical time data. The theoretical time data is entered into the machine tool part program file (called a tape image file) as nonexecutable program steps such as used in remark or comment statements. This theoretical time data is preferably entered at the end of each program block where a significant programmed event occurs. This theoretical time Is the time to reach that point in the machine tool part program. In the alternative, the theoretical time for each machine tool to complete its current task is computed while the machine tool part program is operating by QMTSERVER. This is possible because the theoretical time data is contained in the machine tool part program running on machine tool 5. The computations in the two cases are identical. In either case the Status Bulletin Board information Includes this theoretical time necessary for each machine tool 5 to complete one execution of its current machine tool part program. The TT_FILTER can be run by any user on any node of network 60.

When the manufacture of a batch of part, is completed, the HOST program writes the last of the detailed event records into the file for that specific part number and batch and closes the file. HOST then writes a production batch summary into a file of completed batches. This summary contains approximately 20 fields of information about the manufacture of that specific batch. This record is preferably in what is known as comma separated value format. The comma separated value format is ready for entry into one of many database systems available for IBM PC compatible desk top computers. Once in the database of completed jobs, comparisons with past production runs of the same part can be made. If the results indicate a normal run, the detailed data may, at the users discretion, be discarded or retained as Other Programs/Files. If the batch report indicates abnormal production time, the database may be examined in detail to determine the problem.

In addition to the preceding after the fact report, the real time nature of the event reporting system permits production management to be alerted to deviation from the expected production time early in the running of the production batch. With this early warning, manufacturing engineers can be brought in to find solutions to the problem before much unnecessary time is wasted. As related to this invention, this feedback of overall performance is referred to as closing the outer loop.

The files of event data, while stored on the host computer 20, are available for analysis on any computer attached to network 60. Transmission of such event data to another computer permits analysis of this data, without loading host computer 20 with an additional task. Thus host computer 20 may be able to service a greater number of local computers 10 with their associated machine tools 5 if the processing burden of event data analysis is shifted to another computer. This process will be further described below.

In the foregoing discussion it was assumed that the query status, query event data and run theoretical time filter program requests came from a computer other than host computer 20. This need not be the case. As previously described, host computer 20 preferably employs a multi-tasking operating system. Thus these requests could be made at the console of the host computer 20.

v. The Local Computer Network Boot Process

Central processing unit 11 of Local computer 10 requests the operating system from network interface 12 upon completion of the self-test program following initial application of electric power to local computer 10. The ROM (read only memory) on the network interface 12 in conjunction with the parameters stored in the non-volatile CMOS RAM directs booting of local computer 10. The execution of the ROM code sends a boot request message to the NETBOOT program running on the host computer 20, Upon receipt of this request, the NETBOOT program of host computer 20 transmits the operating system and local computer 10 comes to life. When the user logs in to local computer 10, the initial application program and drivers for the machine tool(s) attached to the particular requesting local computer 10 are downloaded. Network interface 12 on this local computer 10 supplies these programs to central processing unit 11, which stores them in random access memory 16. Local computer 10 then runs these application program(s).

vi. The Local Computer Main Program

Each local computer 10 includes a MAIN program which orchestrates the coordination of subsidiary programs serving as the user interface between local computer 10 and the computer user interface 14, the machine tool interface 17 and the corresponding machine tool 5. This main program begins by permitting the machine tool operator of the particular machine tool 5 to log in. This process Involves entry of a user name with the optional further entry of a password. This process, which is known in the art, serves to identify the particular machine tool operator as someone authorized to operate the corresponding machine tool(s) 5 and authorized to communicate with host computer 20 via the local computer 10.

This main program then presents the machine tool operator with several possible options or subprograms in a menu through the computer user interface 14 and waits for a response. Central processing unit 11 responds to inputs from the computer user interface 14 to select the subprogram. This is a process known in the art of computer programming as command dispatching. This subprogram selection may be made via function keys, keyboard, buttons or a touch screen. All are known in the art. In any event, the essential feature is that the machine tool operator identify the particular program desired to initiate the execution of this subprogram.

One of the subprograms available to the user of local computer 10 runs a machine tool 5. This run machine tool subprogram reads each block of the machine tool part program data and energizes the machine tool 5 and its servo systems through the machine tool interface 17 according to the instructions contained in the block. This subprogram will be described in further detail in conjunction with FIG. 5.

Figure 5:
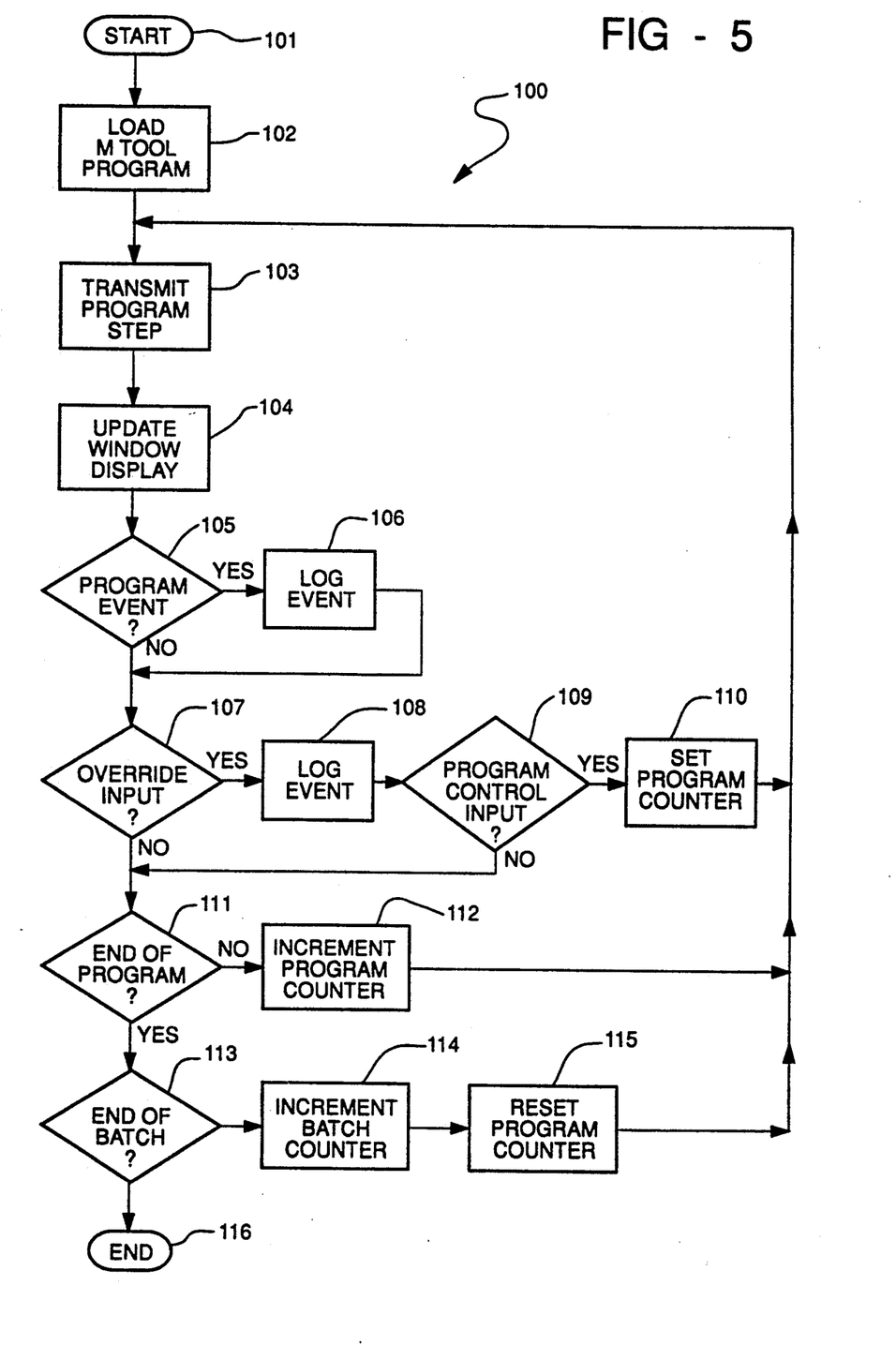
FIG. 5 illustrates in flow chart form the run machine tool program executed on each local computer.

A further subprogram under the run machine tool program checks to determine whether a machine tool part program requires the logging of an event. This can occur upon supply of particular machine tool part program steps containing significant events to the machine tool 5 or when the machine tool operator has pressed particular control buttons. As will be described below an event is logged by identifying the type of event, date and time of occurrence and storing this data in an event buffer within random access memory 16. The logging of an event signals the host communications subprogram that dispatches a message to host computer 20 via the network 60.

Random access memory 16 retains this event if host computer 20 does not acknowledge proper receipt of this message. This could happen if host computer 20 is down or then occupied or if computer network 60 is down. If random access memory 16 retains this event signal, then the next event is written into the next memory location within this event buffer. This event buffer is preferably large enough to hold several hundreds of events in order that the identity, date and time of occurrence of such events can be retained should communication with host computer 20 be interrupted for any reason. New events will overwrite the first entered events in the case in which this event buffer is full. Once host computer 20 has acknowledged proper receipt of an event it is no longer necessary for this event data to be retained within local computer 10 and it can be erased or overwritten. The machine tool subprogram continues in either case whether a machine tool event has been logged or not.

Other functions of local computer 10 are dispatched in a similar manner. These other functions include: scanning the machine tool part program to select a new start point; editing the machine tool part program; changing offsets, etc. Only authorized users, identified by the user name and optional password employed during logging on would be permitted to edit the machine tool part program. Some qualified machine tool operators would be permitted to edit machine tool programs and other less qualified machine tool operators would not. In particular, senior machine tool operators and programming engineers would generally be authorized to modify machine tool programs, while junior machine tool operators and the like would not. Editing a machine tool part program would be in the manner of editing any other program code, either in source or object form, and could involve the use of a display window. The main program also permits the machine tool operator to log off. The machine tool operator would typically log off at the end of a shift. In addition, it is desirable to require log off any time control of machine tool 5 passes to another machine tool operator.

vii. The Local Computer Run Machine Tool Program

FIG. 5 illustrates the execution of the machine tool interface subprogram 100. When a machine tool operator logs in to a node of the network with a machine tool attached and not operating, the machine tool interface program is automatically executed. The techniques for having programs execute automatically on login are well known by those knowledgeable in the art. The execution of the machine tool interface subprogram 200 begins via start block 201. The machine tool is in an idle status until the machine tool operator downloads a machine tool part program. This process involves interaction with local computer 10 via computer user interface 14 and communication with host computer 20. The machine tool operator must select the desired machine tool part program from those available at host computer 20. This is preferably done via a menu selection process. Host computer 20 is aware of the identity of the particular local computer 10 and preferably offers the machine tool operator only those machine tool part programs that are proper for use by the corresponding machine tool(s) 5. Upon selection of a particular machine tool part program, host computer 20 transmits this machine tool part program to local computer 10 via computer network 60. Local computer 10 then stores this machine tool part program within random access memory 16. Running of the particular machine tool part program begins at its first program step.

The process of running the machine tool part program preferably involves a specification of the batch size. In addition, a batch number for management identification of a particular batch may also be provided. The number of parts in the batch is employed later in control of the machine tool operation. The setting of the batch size and batch I.D. are preferably events signaled to host computer 20. Other data for identification of the job for management reports may also be required. Entry of all this data preferably occurs within processing block 102.

Once this process is complete, then the machine tool operates according to the selected machine tool part program. This process involves a loop that repeats the steps necessary to machine a part until the machine tool part program is complete. Completion of the batch of parts involves the execution of the machine tool part program enough times to manufacture the number of parts specified by the batch size.

When the machine tool operator presses the cycle start button on the machine tool, this loop begins by transmitting the next program step to the machine tool (processing block 103). In the initial operation of the machine tool part program this next program step is the first program step. As previously disclosed, this process takes place via machine tool interface 17, which communicates with machine tool 5.

Subprogram 100 signals (sends a message to) the display program to update a window display of the operating program (processing block 104). Computer user interface 14 preferably shows a portion of the currently executing machine tool part program. The executing machine tool part program step is in a predetermined location within this window. The machine tool part program scrolls within this window when executing a new program step. This process serves to appraise the machine tool operator of the status of machine tool 5 within its machine tool part program. Other optional displays are preferably available at the machine tool operator's request. This information may be helpful for the machine tool operator to interpret the current and expected future operation of machine tool 5.

Subprogram 100 next tests to determine whether the just transmitted program step is a programmed significant event (decision block 105). In the present invention, the significant events of the machine tool part program being executed by each machine tool 5 are preferably marked with program events whose time of execution is known. This is possible because such markers are a standard convention in the programming of a machine tool part program. These event marks indicate the points within the program requiring a tool change, a program stop, an optional stop and the end of the program. The present invention also provides the capability for marking other special events in the machine tool part program. An engineer or master machine tool operator charged with debugging or improving a machine tool part program thus may flag particular portions of the program in order to observe its operation during actual manufacture of parts.

If such a program event is detected, then subprogram 100 logs this event (processing block 106). This process involves writing the identity and the date and time of occurrence of this event to the reserved event buffer within random access memory 16. Note that the date and time are obtained from real time clock 13. As explained above, a host communication program running on the local computer 10 is signalled about the logging of such an event and transmits this event to host computer 20.

Whether a program event has been detected, subprogram 100 is signalled when a machine tool operator initiated event is received (decision block 107). The operator of machine tool 5 has limited control over its operation. The host communications module sends a message to host computer 20 to log an event any time this limited control is exercised. In particular, a machine tool operator initiated event preferably occurs when the operator exercises a cycle start, a cycle stop, an optional stop, or feed hold command. In addition, an event is logged when the machine tool operator changes from operator or programmer mode of the machine tool part program or when the operator changes from single step or continuous mode. Lastly, an event is preferably also logged if the machine tool operator exercises the feed rate override (FRO), spindle speed override (SSO) or the traverse rate override (TRO). The operation of any of these overrides will generate a machine tool operator initiated significant event that will be recorded. Upon detection of any such operator initiated event, the identity and date and time are logged (processing block 108) in the manner previously described. Note that the host communications program transmits any such logged event to host computer 20.

Subprogram 100 next tests to determine whether this machine tool operator override input involves program control (decision block 109). The machine tool operator may repeat or skip certain blocks of the program in manufacturing a single part. This may occur in reworking a single part. Such a change in the program location requires a change in the manner in which the machine tool interface 17 transmits the program to machine tool 5. If the detected machine tool operator override is such a program control operation, then subprogram 100 sets the program counter to the location corresponding to the operator override (processing block 110). This location is the beginning of the repeated program block or the point following a skipped block. Subprogram 100 then returns to the beginning of the loop at processing block 103 to transmit this next program step to the machine tool. In all other cases, the loop continues.

Subprogram 100 next tests to determine whether the just transmitted program step is the end of the machine tool part program (decision block 111). If this is not the end of the part program then the program counter is incremented (processing block 112). Program control then returns to processing block 103 to repeat the loop by transmission of the next program step (processing block 104). If the last transmitted program step was the end of the program, then a part has been completed. This is a program event and would have been detected at decision block 105 and logged at processing block 106.

Subprogram 100 then tests to determine whether the end of the batch has been reached (decision block 113). If the batch has not been reached then subprogram 100 increments the batch counter (processing block 114) and resets the program counter to the beginning of the program (processing block 115). Subprogram 100 then returns to the beginning of the loop at processing block 103 to transmit the next program step, which here is the first step of the program. This begins the process of manufacturing another part of the batch.

If the program has completed the end of the batch then subprogram 100 signals host computer 20 that a batch has been completed. Additional parts may still be made, but they will be made under an exception condition. The final end to the production of this batch of parts occurs after the job cleanup when the machine tool operator downloads a new machine tool part program for the next batch of parts.

Host computer 20 serves as the depository for the time and date stamped event signals for all active machine tools. This event data may be reviewed at a later time for analysis of the operation of a particular machine tool part program. Summary statistics regarding manufacture of a particular part with the same machine tool part program can be computed from this event data. These summary statistics permit comparison of the performance of differing versions of the machine tool part program for making the same part, and thus enables improvement of the machine tool part program. This review may reveal the source of problems with the machine tool part program or with the operation of the machine tool by a particular operator. Review of the event data stored in host computer 20 may be at host computer 20 or at any computer connected to network 60.

viii. Query Machine Tool Status

Figure 6:
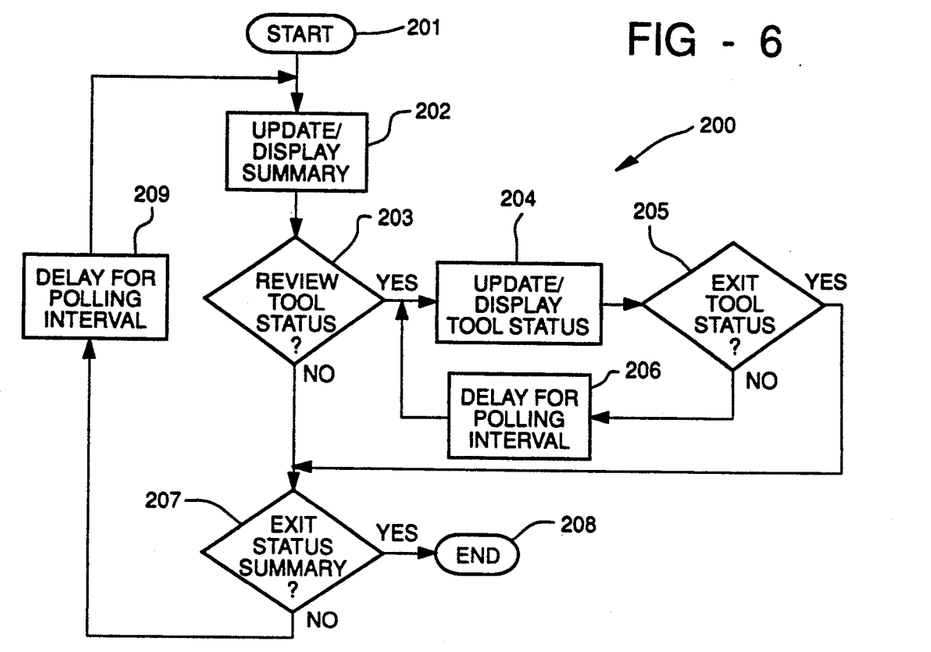
FIG. 6 illustrates in flow chart form the query machine tool subprogram's function.

FIG. 6 illustrates query machine tool status function 200. Query machine tool status function 200 may be performed at any computer on the network, such as local computer 10, host computer 20 and most especially supervisor computer 30, manager computer 40 and engineering computer 50. As noted above, the program named HOST running on the host computer 20 maintains a Status Bulletin Board covering all of the operating machine tools 5. The query machine tool server QMTSERVER provides the status information to any user activating a copy of the query machine tool status function 200 (QMTPOLLER). The screen is automatically updated, based on the polling period, as long as the query machine tool status program QMTPOLLER is running.

Query machine tool status function 200 begins via start block 201. Program 200 then enters a loop controlled by the polling period set for the execution of the query program. It first updates and displays a summary of the operation of all operating machine tools on computer network 60 (processing block 202). Host computer 20 is in communication with the requesting computer via computer network 60. Host computer 20 receives event signals corresponding to the current operation of each machine tool 5 from the corresponding local computer 10. Host computer 20 also has received from the corresponding local computer 10, data on the batch size and data permitting calculation of the number of parts within each batch that has been manufactured by each machine tool 5. The display summary preferably includes data identifying the machine tool, the particular part, the current batch operating and the machine tool mode. The mode is selected from among the set including setup, running, program stop, halt, program change, clean up, idle, maintenance and off line. The various operating modes are preferably displayed in differing colors. The display 22 (or the display of computer user interface 14 of local computer 10) preferably includes a color cathode ray tube capable of displaying these differing colors. Green is displayed for the running mode. Yellow is displayed for set up, program stop, part change, clean up and maintenance modes. Red is displayed for the halt, idle and off line modes. Further, in the running mode the display preferably turns partially red based on the amount of feed rate override (FRO), spindle speed override (SSO) or the traverse rate override (TRO) currently being applied. QMTSERVER running on host computer 20 preferably also calculates, employing the theoretical time data imbedded in the machine tool part program by the theoretical time filter, the estimated time for the machine tool to complete the current batch. As previously described, this theoretical time to completion preferably takes into account the scheduled idles times stored in the Expected Idle Times portion of hard disk 28. In any event this summary display gives any computer user or supervisory personnel an overview of the operation of all the machine tools on the network.

Program 200 next tests to determine whether the computer user wishes to review the status of a particular machine tool (decision block 203). If the computer user selects review of the status of a particular tool then program 200 updates and displays the status of that particular tool (processing block 204). This process preferably includes specification of the particular machine tool and its corresponding local computer 10. In the preferred embodiment, the computer user moves a highlighted bar on the display via cursor keys for specification of the particular machine tool. The display regarding the specific machine tool status preferably includes all the information displayed in the summary discussed above. In addition, this display should include additional information regarding the current task such as work order, lot number or batch number, the part number, etc. This machine tool status display preferably includes information regarding the current production quantity completed and the completed proportion of the manufacture of the present part. Program 200 tests to determine whether the computer user desires to exit tool status display (decision block 205). If the computer user does not wish to change the tool status display then program 200 delays for a predetermined polling interval (processing block 206) and refreshes the display with the then current information. This polling interval is selected to be short enough to follow changes in the machine tool status while long enough not to overburden network 60. The preferred default polling interval is one second. Control then returns to processing block 204 to update and display the tool status.

Upon failure to request the review of a particular tool status, or upon exit of review of a particular tool status, program 200 tests to determine whether the computer user wishes to leave the status summary (decision block 207). If the computer user does not wish to exit the status summary then program 200 delays for the predetermined polling interval (processing block 209). Control returns to processing block 202 to again update and display the machine tool summary. Program 200 remains in this loop until the computer user selects exiting the status summary. Then query machine function program 200 exits via end block 208. This causes the concurrent task of program 200 to terminate.

x. Additional Functions

There are several additional functions that may be performed by any computer on the network. One of these additional functions is editing a machine tool part program. Editing a machine tool part program can be employed to produce, debug and modify machine tool part programs for a variety of machine tools.

A second additional function is analysis of the event data stored by host computer 20. As previously discussed, data corresponding to events occurring during a particular batch on a particular machine tool 5 will be stored in a file within hard disk 28. Upon termination or completion of a batch process, this file will be closed and will no longer accumulate additional event signals. Either as a normal operation of host computer 20 or as initiated by any computer on the network, a statistical summary of this batch is computed. This statistical summary may be combined with prior statistical summaries to form a long term history. The user of any computer on the network can request this data from host computer 20 to analyze the time occurrence of significant events within the manufacturing operation. This may be particularly useful when the actual performance of the machine tool is compared with the computed theoretical times and the average actual times of prior batches.

This process is believed highly advantageous in debugging and improving machine tool part programs. Heretofore a master machine tool operator or programming engineer must rely upon the memory of one or more machine tool operators to detect occurrence of unusual and infrequent events. For example, the current machine tool part program may cause premature failure of a particular tool. In manufacturing operations employing more than one operator on the same machine tool in differing shifts, it is unlikely that a single machine tool operator will notice the premature failure of this tool. However, analysis of all machine tool operations employing this program would permit recognition of the premature tool failure. Those skilled in the art would quickly realize that this Is but one example of the manner in which the time record of machine tool events may be employed. In any event the assembly of such a time record of tool events permits debugging and modification of machine tool part programs for greater manufacturing efficiency.

VI. Alternative Local Computer

Figure 7:
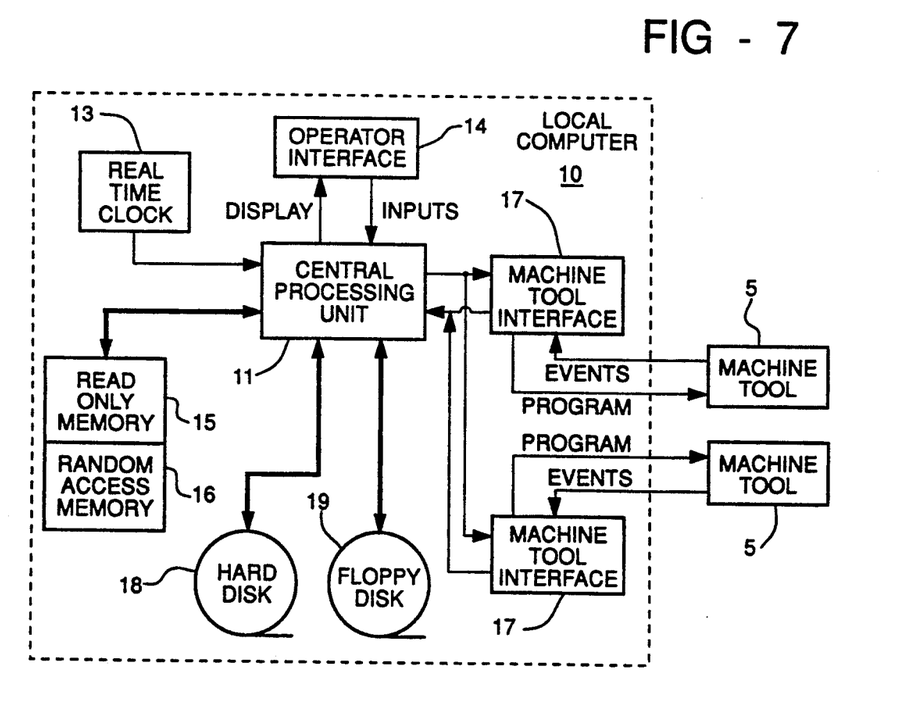
FIG. 7 illustrates in block diagram form the construction of a local computer in accordance with an alternative embodiment of this invention.

FIG. 7 illustrates the construction of local computer 10 in accordance with an alternative embodiment of this invention. In this alternative embodiment local computer 10 operates independently in control of one or more machine tools 5. This construction differs from the construction illustrated in FIG. 2 in the substitution of nonvolatile read/write memory for network interface 12. FIG. 7 includes nonvolatile read/write memory in the form of hard disk 18 and floppy disk 19. Local computer 10 must have all the needed programs available from 0 sources. In addition, central processing unit 11 must have the computing capacity to handle all the tasks required for control of the attached machine tools 5. In other respects the invention operates in accordance with the previous description.

It should be clear to anyone familiar with the current art of computers that the techniques utilized in this invention could be applied to the presently utilized computer numerically controlled machine tools through the addition of event reporting software/firmware to the present controls. In this case, the events could be reported via the RS232 or RS422 serial ports of the controller and could be collected in a similar manner on a host computer. The applicant believes this would satisfy the reporting aspect of this patent application, but would fail to provide the opportunities for further improvement in the manufacturing process when the machine tools are truly peripheral devices to the nodes of this computer network.

I claim:

1. A method for controlling one or more numerically controlled machine tools, comprising the steps of:
   supplying a machine tool part program to each machine tool;
   detecting the occurrence of one of a predetermined set of events at each machine tool;
   determining the real time upon each detection of an event;
   generating an event signal indicating the identity of the detected event and the time of occurrence upon each detection of an event;
   producing a user perceivable indication on a color video display of the machine tool status based upon the identity of the last detected event, the machine tool status being indicated by colors that correspond to each possible machine tool status; and
   storing in a nonvolatile read/write memory corresponding to each machine tool part program an indication of the theoretical time for each machine tool to perform each of a plurality of sections of the machine tool part program;
   wherein the step of producing a user perceivable indication of the machine tool status includes producing a user perceivable indication of an estimated completion time for the current part on the machine tool based upon the last program step supplied to the machine tool and the indication of the theoretical time to perform each section of the machine tool part program.

2. The method of controlling one or more numerically controlled machine tools as set forth in claim 1, wherein:
   the method further includes the step of storing in a nonvolatile read/write memory an indication of times of day when the machine tool is normally idle; and
   the step of producing a user perceivable indication of the estimated completion time takes into account the times of day when the machine tool is normally idle.

3. A computer for controlling one or more numerically controlled machine tools, comprising:
   a memory for storing a machine tool part program for execution by each machine tool for detecting the occurrence of one of a predetermined set of events;
   a machine tool interface for each machine tool that is connected to the machine tool and to the memory;
   a real time clock for generating a real time signal indicative of the current day and time;
   a central processor connected to the memory, each of the machine tool interfaces, and the real time clock for generating an event signal that indicates the identity of the detected event, the time of occurrence of the detected event, and the identity of the machine tool upon each detection of one of the predetermined set of events; and
   a video display device connected to the central processor;
   wherein the central processor produces a user perceivable indication on the video display device of the status of each machine tool based upon the identity of the last detected event at the machine tool via colors corresponding to each possible machine tool status;
   and wherein each machine tool part program includes an indication of the theoretical time for the corresponding machine tool to perform each of a plurality of sections of the machine tool part program;
   and wherein the central processor produces a user perceivable indication of the machine tool status by producing a user perceivable indication of an estimated completion time for the current part on each machine tool based upon the last program step supplied to the corresponding machine tool and the indication of the theoretical time to perform each section of the machine tool part program.

4. The computer for controlling one or more machine tools as set forth in claim 3, and further including:
   a nonvolatile read/write memory having stored therein an indication of times of day when each of the machine tools is normally idle;
   wherein the central processor produces a user perceivable indication of the machine tool status by producing an indication of the estimated completion time that takes into account the times of day when the machine tool is normally idle.

5. A network for controlling one or more numerically controlled machine tools, comprising:
   a computer communications network for data communications;
   a local computer connected to each machine tool and to the computer communications network, each local computer including:
      a memory for storing a machine tool part program for the machine tool;
      a machine tool interface connected to the machine tool and to the memory for supplying a machine tool part program to the machine tool and for detecting the occurrence of one of a predetermined set of events at the machine tool upon supply of one of a predetermined set of program steps of the machine tool part program to the machine tool;
      a real time clock for generating a real time signal indicative of the current day and time;
      a local network interface connected to the computer communications network for receiving data from and transmitting data to the computer communications network; and a central processor connected to the memory, the machine tool interface, the real time clock and the local network interface, the central processor generating an event signal that indicates the identity of the detected event, the time of occurrence of the detected event, and the identity of the machine tool upon each detection of one of the predetermined set of events and the central processor transmitting the event signals on the computer communications network via the local network interface; and a network host computer connected to the computer communications network, the host computer including:

a host network interface connected to the computer communications network for receiving data from and transmitting data to the computer communications network;

a nonvolatile read/write memory; and a central processor connected to the network interface and the nonvolatile read/write memory for receiving the event signals transmitted by each of the local computers and for storing the received event signals in the nonvolatile read/write memory.

6. The network for controlling one or more numerically controlled machine tools as set forth in claim 5, wherein:

the host computer generates a status summary indicative of the status of each machine tool based upon the last received event signal from the local computer corresponding to that machine tool.

7. The network for controlling one or more numerically controlled machine tool as set forth in claim 6, wherein:

at least one computer connected to the computer communications network further includes a color video display device and means for generating a signal screen color video display on the color video display device corresponding to the status summary by indicating the status of each machine tool via colors corresponding to each of a predetermined set of status indications.

8. The network for controlling one or more numerically controlled machine tools as set forth in claim 7, wherein:

the at least one computer connected to the computer communications network further includes an input device and means for producing a video display of the status of a selected machine tool by receiving a selection signal via the input device for selection of a particular machine tool and generating a single screen color video display of the status of the selected machine tool having a background color corresponding to the status of the selected machine tool.

9. The network for controlling one or more numerically controlled machine tools as set forth in claim 8, wherein:

the host computer stores in the nonvolatile read/write memory an indication of the theoretical time for each machine tool to perform at least one section of the machine tool part program; and the at least one computer connected to the computer communications network further includes means for generating the single screen color video display of the status of the selected machine tool, the video display including an estimated completion time for the current part on the machine tool.

10. The network for controlling one or more numerically controlled machine tools as set forth in claim 9, wherein:

the host computer stores in the nonvolatile read/write memory an indication of times of day when the machine tools are normally idle; and the at least one computer connected to the computer communications network further includes means for generating the estimated completion time for the current part on the machine tool taking into account the times of day when the machine tools are normally idle.

11. The network for controlling one or more numerically controlled machine tools as set forth in claim 5, wherein:

at least one computer connected to the computer communications network further includes means for recalling a selected time labeled record of event signals from the nonvolatile read/write memory of the host computer and means for producing a user perceivable indication of the recalled time labeled record of event signals.

12. The network for controlling one or more numerically controlled machine tools as set forth in claim 5, and further including:

at least one additional computer connected to the computer communications network for requesting a selected set of event signals from the network host computer via the computer communications network, for receiving the requested set of event signals from the network host computer via the computer communications network, and for producing a user perceivable indication of the requested set of event signals;

wherein the host computer supplies a requested time labeled record of event signals to a requesting additional computer via the computer communications network.

* * * * *